United States Patent [19]

Kanbe

[11] 4,290,905

[45] Sep. 22, 1981

[54] ESTER COMPOUND

[75] Inventor: Sadao Kanbe, Suwa, Japan

[73] Assignee: Kabushiki Kaisha Suwa Seikosha, Tokyo, Japan

[21] Appl. No.: 107,002

[22] Filed: Dec. 26, 1979

[51] Int. Cl.$^3$ ............ G02F 1/13; C09K 3/34; C07C 69/74

[52] U.S. Cl. ............... 252/299.63; 252/408; 350/350 R; 560/1; 560/114

[58] Field of Search ............. 252/299, 408; 350/350 R; 560/1, 114

[56] References Cited

U.S. PATENT DOCUMENTS

| | | | |
|---|---|---|---|
| 4,013,582 | 3/1977 | Gavrilovic | 252/299 |
| 4,065,489 | 12/1977 | Steimstrasser | 252/299 |
| 4,096,086 | 6/1978 | Kanbe | 252/299 |
| 4,103,482 | 8/1978 | Maruyama | 252/299 |
| 4,113,647 | 9/1978 | Coates et al. | 252/299 |
| 4,138,359 | 2/1979 | Mizukuchi | 252/299 |
| 4,154,697 | 5/1979 | Eidenschimk et al. | 252/299 |
| 4,162,988 | 7/1979 | Maze et al. | 252/299 |
| 4,216,109 | 8/1980 | Mizukuchi | 252/299 |
| 4,229,315 | 10/1980 | Krause et al. | 252/299 |

FOREIGN PATENT DOCUMENTS

| | | | |
|---|---|---|---|
| 2752975 | 8/1978 | Fed. Rep. of Germany | 252/299 |
| 2836086 | 3/1979 | Fed. Rep. of Germany | 252/299 |
| 2800553 | 7/1979 | Fed. Rep. of Germany | 252/299 |
| 105701 | 5/1979 | German Democratic Rep. | 252/299 |
| 137597 | 9/1979 | German Democratic Rep. | 252/299 |

OTHER PUBLICATIONS

Sadashiva, B. K., Mol. Cryst. Liq. Cryst., vol. 55, pp. 135–142 (1979).

Gray, C. W. et al., Mol. Cryst. Liq. Cryst., vol. 53, pp. 147–166 (1979).

Primary Examiner—Teddy S. Gron

Attorney, Agent, or Firm—Blum, Kaplan, Friedman, Silberman and Beran

[57] ABSTRACT

An ester compound having the formula

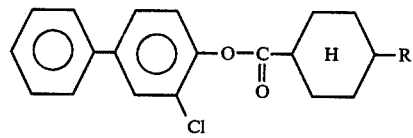

where R represents a normal alkyl group having one to eight carbon atoms. A method of synthesizing the compounds is presented. The compounds have relatively low melting points, and are particularly useful in combination with other liquid crystal compounds.

6 Claims, No Drawings

ESTER COMPOUND

BACKGROUND OF THE INVENTION

In the construction and operation of liquid crystal displays, the displays can be based on operation in the field-effect mode, the dynamic scattering mode, and the guest-host mode. Such liquid crystal displays are used in electronic desk calculators, wrist watches, and digital instruments. The liquid crystal composition must be stable over substantial periods of time, and the liquid crystal temperature range must include the temperature at which the devices are to be used. In general, liquid crystal compounds of high stability have relatively high melting points, so that it is necessary to combine a plurality of liquid crystal compounds in order to achieve a composition having a liquid crystal temperature range which includes room temperature. The present invention discloses new compounds useful in such liquid crystal composition.

SUMMARY OF THE INVENTION

The compounds of the present invention have the following formula:

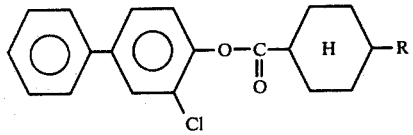

where R is a linear alkyl group of one to eight carbon atoms. The compounds may also be represented as trans-4-n-alkyl cyclohexane-1-carboxylic acid-2'-chloro-4'-phenylphenylester. These compounds have liquid crystal temperature ranges of 20° C. to 40° C., the melting points of the compounds being from 50° C. to 60° C. Specifically, the compound in which R is $C_5H_{11}$ has a melting point of 45° C., and a clearing point of 87° C.

The general method of making the compounds is to reduce a 4-n-alkyl benzoic acid to the corresponding disubstituted cyclohexane compound, convert the cyclohexane compound to the acid chloride by the use of thionyl chloride, and to react the acid chloride with 2-chloro-4-phenylphenol.

An object of the present invention is a new type of compound useful in liquid crystal compositions for liquid crystal display devices.

Another object of the present invention is a new type of liquid crystal compound of high stability.

A further object of the present invention is a method of synthesizing the above type of compound.

Still another object of the present invention is a method of purifying the above type of compound after synthesis.

An important object of the present invention is a composition comprising said compound.

The invention accordingly comprises the several steps in the relation of one or more of such steps with respect to each of the others, and the compounds and compositions possessing the features, properties and the relation of constituents which are exemplified in the following detailed disclosure, and the scope of the invention will be indicated in the claims.

DESCRIPTION OF THE PREFERRED EMBODIMENTS

As aforenoted, compounds having the formula

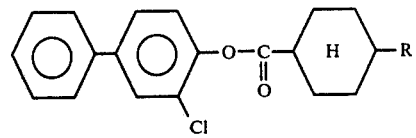

where R is a linear alkyl group of one to eight carbon atoms, are unusually stable and have relatively low melting points with a relatively wide liquid crystal temperature range.

To prepare such compounds, a trans-4-n-alkyl-cychlohexane-1-carboxylic acid is reacted with thionyl chloride to produce an acid chloride as shown in the following equation:

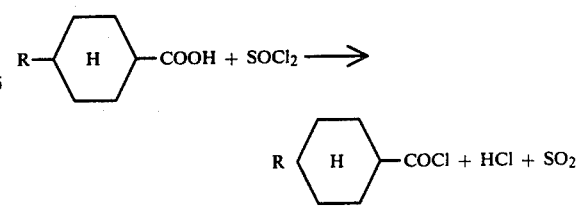

The acid chloride is then reacted with 2-chloro-4-phenylphenol as follows:

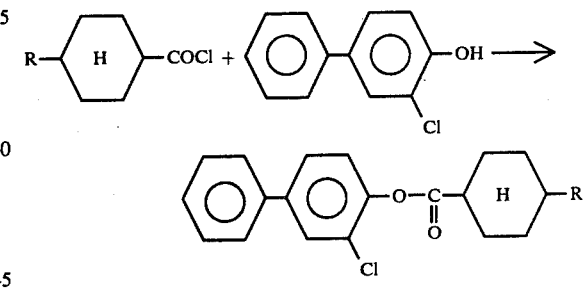

The breadth of the liquid crystal temperature range is from 20° C. to 40° C., and the melting point, in general, lies between 50° C. and 60° C. Of the compounds, that in which R is $C_5H_{11}$ is preferred, the compound having a melting point of 45° C., and a clearing point of 87° C.

Liquid crystal compositions, including compounds of the type taught herein, have mesophases which include room temperature. They are particularly useful in combinations with biphenyl liquid crystal compounds and other ester liquid crystal compounds. The method of synthesis of the compounds of the present invention is now presented in more detail.

First, the trans-4-n-alkyl cychlohexane-1-carboxylic acid is obtained by reducing the corresponding 4-n-alkyl benzoic acid. The method of carrying out the reduction is well known and is taught in Z. "Chem," 12 "Jg." (1972) "Hef." 6 (Zeitschrift fur Chemie, 12. Jahrgang 1972. Heft 6). Next, the carboxylic acid is heated under reflux with excess thionyl chloride, the reaction being continued until evolution of HCl ceases. Thionyl chloride is removed under reduced pressure and the residue is then distilled, also under reduced pressure, to yield the acid chloride. The 2-chloro-4-phenylphenol and the acid chloride are placed in a flask and heated at 80° C. for 30 minutes. After heating for this period, the reaction mixture is recrystallized from ethanol to produce the compounds of the present invention. The yield is about 50%, based on the quantity of trans-4-n-alkyl-cyclohexane-1-carboxylic acid.

The following example illustrates the production of specific alkyl compounds.

EXAMPLE 1

Production of trans-4-n-propyl-cyclohexane-1-carboxylic acid chloride.

10 g of trans-4-n-propyl-cyclohexane-1-carboxylic acid and 20 ml of thionyl chloride are added to a 100 ml flask and heated under reflux until the evolution of hydrogen chloride gas ceases. After refluxing, the surplus thionyl chloride is removed under reduced pressure, and the residue is distilled under reduced pressure to obtain the acid chloride. 1.9 g of the acid chloride are placed with 2.2 g of 2-chloro-4-phenylphenol in a 100 ml flask and heated to 80° C. for 30 minutes. After heating, the reaction mixture is recrystallized from ethanol to obtain 2 g of trans-4-n-propylcyclohexane-1-carboxylic acid-2'-chloro-4'-phenylphenylester. The white crystalline compound has a melting point of 61° C. and a clearing point of 87° C. The infrared absorption spectrum of the compound is shown in FIG. 1.

EXAMPLES 2, 3 and 4

Trans-4-n-alkylcyclohexane-1-carboxylic acid, in which the alkyl group is butyl, amyl and hexyl, respectively, are used in place of the compound of Example 1, in which the alkyl is propyl. The acid chlorides produced by the method of Examples 1–4 are shown in Table 1.

TABLE 1

| Compound | Boiling point | Yield |
| --- | --- | --- |
| trans-4-n-propyl cyclohexane-1-carboxylic acid chloride | 112° C./10mmHg | 80% |
| trans-4-n-butyl cyclohexane-1-carboxylic acid chloride | 86–89° C./1mmHg | 75% |
| trans-4-n-amyl cyclohexane-1-carboxylic acid chloride | 82–86° C./0.5mmHg | 83% |
| trans-4-n-hexyl cyclohexane-1-carboxylic acid chloride | 103–106° C./0.5mmHg | 81% |

(The yield is based on the quantity of 2-chloro-4-phenyl phenol used in the synthesis.)

Table 2 shows the properties of the liquid crystal esters produced by the methods of Examples 1–4, and also gives the yield based on the quantity of 2-chloro-4-phenylphenol used.

TABLE 2

| Compound | Melting point (°C.) | Transparent point (°C.) | Yield Ratio |
| --- | --- | --- | --- |
| trans-4-n-propyl cyclohexane-1-carboxylic acid-2'-chloro-4'-phenylphenylester | 61 | 87 | 70% |
| trans-4-n-butyl cyclohexane-1-carboxylic acid-2'-chloro-4'-phenylphenylester | 59 | 81.5 | 75% |
| trans-4-n-amyl cyclohexane-1-carboxylic acid-2'-chloro-4'-phenylphenylester | 48 | 87 | 74% |
| trans-4-n-hexyl cyclohexane-1-carboxylic acid-2'-chloro-4'-phenylphenylester | 48 | 77.5 | 78% |

(The yield is based on the quantity of 2-chloro-4-phenyl phenol used in the synthesis.)

The other esters, namely, those in which the number of carbons in R is 1, 2, 7 or 8, are made in accordance with the method taught above. However, the properties of the compounds in which the number of carbon atoms in R is from 3–6 are preferred.

Table 3 shows a composition comprising a compound of the present invention in which R is amyl, and FIG. 5 shows the contrast characteristics of this liquid crystal composition at 20° C. in a display cell. The cell was driven by alternating current of 3 V and 32 Hz. The setting time was 325 msec, and the erase time was 190 msec.

It will thus be seen that the objects set forth above, among those made apparent from the preceding description, are efficiently attained, and, since certain changes may be made in carrying out the above method in the product and in the composition set forth without departing from the spirit and the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Ester compound useful in liquid crystal displays, said compound having the formula

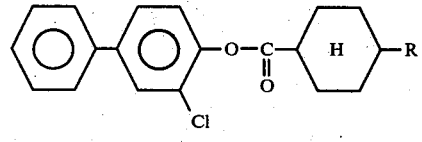

where R is an n-alkyl group of from 3 to 6 carbon atoms.

2. The ester compound as claimed in claim 1, wherein said R is $C_5H_{11}$ for defining trans-4-n-amyl cyclohexane-1-carboxylic acid-2'-chloro-4'-phenylphenylester.

3. Liquid crystal composition useful in liquid crystal displays, said composition consisting essentially of

| | Percentage by weight of components |
| --- | --- |
| 4-n-butyl benzoic acid-4'-cyanophenylester | 10% |
| 4-n-amyl benzoic acid-4'-cyanophenylester | 14% |
| 4-n-heptyl benzoic acid-4'-cyanophenylester | 22% |
| 4-n-octyl benzoic acid-4'-cyanophenylester | 24% |
| 4-n-amyl benzoic acid-4'-hexyloxyphenylester | 10% |
| 4-n-hexyl oxybenzoic acid-4'-n-heptylphenylester | 10% |
| 4-n-amyl cyclohexane-1-carboxylic acid-2'-chloro-4'-phenylphenylester | 10% |

4. The ester compound in claim 1, wherein R is $C_3H_7$ for defining trans-4-n-propyl cyclohexane-1-carboxylic acid-2'-chloro-4'-phenylphenylester.

5. The ester compound of claim 1, wherein R is $C_4H_9$ for defining trans-4-n-butyl cyclohexane-1-carboxylic acid-2'-chloro-4'-phenylphenylester.

6. The ester compound of claim 1, wherein R is $C_6H_{13}$ for defining trans-4-n-hexyl cyclohexane-1-carboxylic acid-2'-chloro-4'-phenylphenylester.

* * * * *